United States Patent
Reehil, III et al.

(10) Patent No.: US 12,086,833 B2
(45) Date of Patent: Sep. 10, 2024

(54) APPARATUSES AND METHODS FOR FACILITATING A GENERATION AND USE OF MODELS

(71) Applicant: AT&T Intellectual Property I, L.P., Atlanta, GA (US)

(72) Inventors: William E. Reehil, III, Jackson, NJ (US); Robby Maharajh, Malverne, NY (US); Harish Venkata Kajur, Piscataway, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 8 days.

(21) Appl. No.: 17/204,998

(22) Filed: Mar. 18, 2021

(65) Prior Publication Data
US 2022/0301012 A1    Sep. 22, 2022

(51) Int. Cl.
*G06Q 30/0251*    (2023.01)
*G06F 16/435*    (2019.01)
(Continued)

(52) U.S. Cl.
CPC ....... *G06Q 30/0269* (2013.01); *G06F 16/437* (2019.01); *G06F 16/438* (2019.01);
(Continued)

(58) Field of Classification Search
CPC ............ G06Q 30/0269; G06Q 30/0256; G06F 16/437; G06F 16/438; H04W 64/003; H04W 64/006
See application file for complete search history.

(56) References Cited

U.S. PATENT DOCUMENTS

| | | |
|---|---|---|
| 5,202,985 A | 4/1993 | Goyal |
| 5,428,776 A | 6/1995 | Rothfield |
| (Continued) | | |

FOREIGN PATENT DOCUMENTS

| | | |
|---|---|---|
| WO | 2020169518 A1 | 8/2020 |
| WO | 2021009643 A1 | 1/2021 |

OTHER PUBLICATIONS

Consens, M. et al., "Supporting Network Management through Declaratively Specified Data Visualizations", In Proceedings of the IFIP TC6/WG6.6 Third International Symposium on Integrated Network Management with participation of the IEEE Communications Society CNOM and with support from the Institute for Educational Services, 725-738, 1993, 16 pgs.

(Continued)

*Primary Examiner* — Christine Ng
(74) *Attorney, Agent, or Firm* — Guntin & Gust, PLC; John G. Rauch

(57) ABSTRACT

Aspects of the subject disclosure may include, for example, presenting a first model representative of a communication system, receiving, based on the presenting of the first model, a first input that identifies a first communication device included in the communication system, responsive to the receiving of the first input, presenting values for a plurality of operating parameters associated with the first communication device, receiving a second input that includes a modification of at least one value of a parameter included in the plurality of operating parameters, identifying, based on the receiving of the second input, a second model that is dependent on the first model, and modifying the second model based on the identifying of the second model. Other embodiments are disclosed.

20 Claims, 9 Drawing Sheets

(51) Int. Cl.
 *G06F 16/438* (2019.01)
 *H04W 64/00* (2009.01)
 *H04W 84/02* (2009.01)

(52) U.S. Cl.
 CPC ...... *G06Q 30/0256* (2013.01); *H04W 64/003* (2013.01); *H04W 64/006* (2013.01); *H04W 84/02* (2013.01)

(56) References Cited

U.S. PATENT DOCUMENTS

| | | | |
|---|---|---|---|
| 5,872,783 A * | 2/1999 | Chin | H04L 49/3009 370/395.32 |
| 6,208,985 B1 | 3/2001 | Krehel | |
| 7,239,629 B1 * | 7/2007 | Olshansky | H04Q 3/0045 370/353 |
| 7,979,424 B2 | 7/2011 | Dettinger et al. | |
| 8,255,513 B2 | 8/2012 | Assa | |
| 8,612,486 B2 | 12/2013 | Maheshwari et al. | |
| 8,996,552 B2 | 3/2015 | Munkes et al. | |
| 9,225,610 B2 | 12/2015 | Murase et al. | |
| 9,240,930 B2 | 1/2016 | Smith et al. | |
| 9,258,195 B1 | 2/2016 | Pendleton et al. | |
| 9,531,885 B2 | 12/2016 | Day et al. | |
| 9,929,915 B2 | 3/2018 | Erickson et al. | |
| 9,992,082 B2 | 6/2018 | Macneil et al. | |
| 10,200,893 B2 | 2/2019 | Tzolov et al. | |
| 10,380,186 B2 | 8/2019 | Sityon et al. | |
| 10,447,546 B1 | 10/2019 | Guo et al. | |
| 10,530,661 B2 | 1/2020 | Kanza et al. | |
| 10,657,134 B2 | 5/2020 | Gadodia et al. | |
| 10,680,891 B2 | 6/2020 | Thomasson et al. | |
| 10,747,757 B1 | 8/2020 | Puvvada et al. | |
| 2002/0021675 A1 * | 2/2002 | Feldmann | H04L 45/563 370/254 |
| 2007/0027937 A1 * | 2/2007 | McGrattan | G06F 11/1456 |
| 2007/0036076 A1 * | 2/2007 | Boggs | H04Q 3/0066 370/230 |
| 2007/0106761 A1 * | 5/2007 | Beoughter | G06Q 50/04 709/219 |
| 2010/0322621 A1 * | 12/2010 | Jenkins | H04B 10/07 398/26 |
| 2013/0185134 A1 * | 7/2013 | Hung | G06Q 30/0231 705/14.31 |
| 2013/0329650 A1 * | 12/2013 | Cui | H04B 7/024 370/329 |
| 2015/0289210 A1 * | 10/2015 | Zhao | H04W 52/225 455/522 |
| 2016/0174131 A1 * | 6/2016 | Shanmugalingam | H04L 41/40 370/328 |
| 2017/0086115 A1 * | 3/2017 | Chung | H04L 41/40 |
| 2017/0235785 A1 * | 8/2017 | Feltham | G06F 16/24568 707/690 |
| 2018/0115469 A1 | 4/2018 | Erickson et al. | |
| 2018/0123888 A1 | 5/2018 | Andrews | |
| 2018/0165361 A1 | 6/2018 | Erickson et al. | |
| 2019/0294962 A1 * | 9/2019 | Vezer | G06N 3/088 |
| 2019/0312945 A1 * | 10/2019 | Cooppan | H04L 41/0809 |
| 2022/0060541 A1 * | 2/2022 | Shokooh | G06F 16/27 |
| 2022/0070193 A1 * | 3/2022 | Konda | G06N 3/0454 |
| 2022/0180199 A1 * | 6/2022 | Xu | G06N 3/0454 |
| 2022/0272597 A1 * | 8/2022 | Kumar | H04W 36/00837 |

OTHER PUBLICATIONS

Jamkhedkar, P. et al., "A Graph Database for a Virtualized Network Infrastructure", In Proceedings of the 2018 International Conference on Management of Data (SIGMOD '18). Association for Computing Machinery, 1393-1405. Ol:https://doi.org/10.1145/3183713.3190653, 2018, 12 pages.

Mogul, J. et al., "Experiences with Modeling Network Topologies at Multiple Levels of Abstraction", https://www.usenix.org/conference/nsdi20/presentation/mogul, This paper is included in the Proceedings of the 17th USENIX Symposium on Networked Systems Design and Implementation (NSDI '20), Feb. 25, 2020, 17pgs.

Voellmy, A. et al., "Query Your Network Like a Database to Gain Knowledge and Simplify Operations", https://www.forwardnetworks.com/network-query-engine/ Jan. 23, 2019 | In Blog, Networking, Product | By Andreas Voellmy, Brandon Heller, and Gary Kinghorn, Jan. 23, 2019, 12 pgs.

* cited by examiner

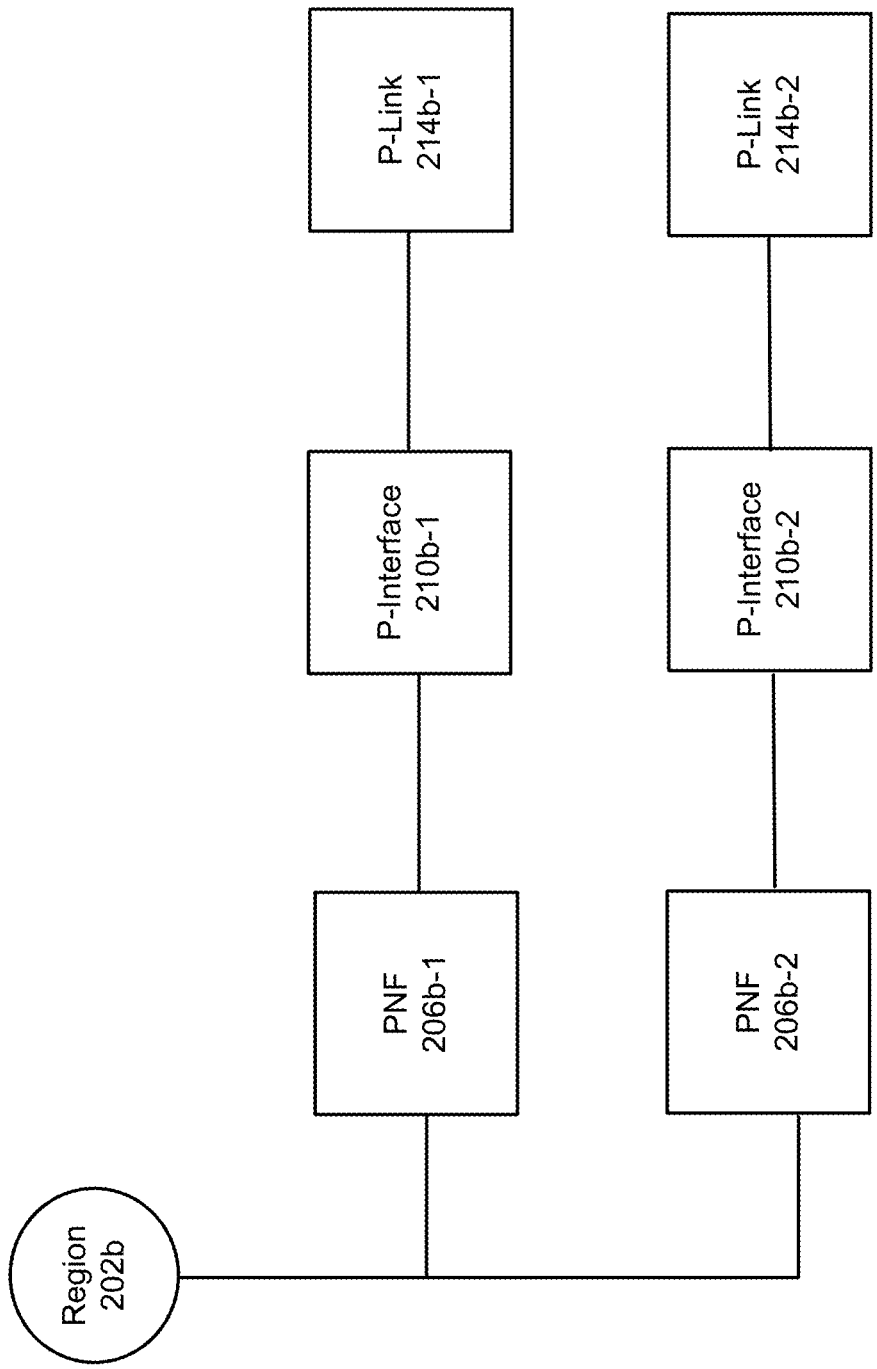

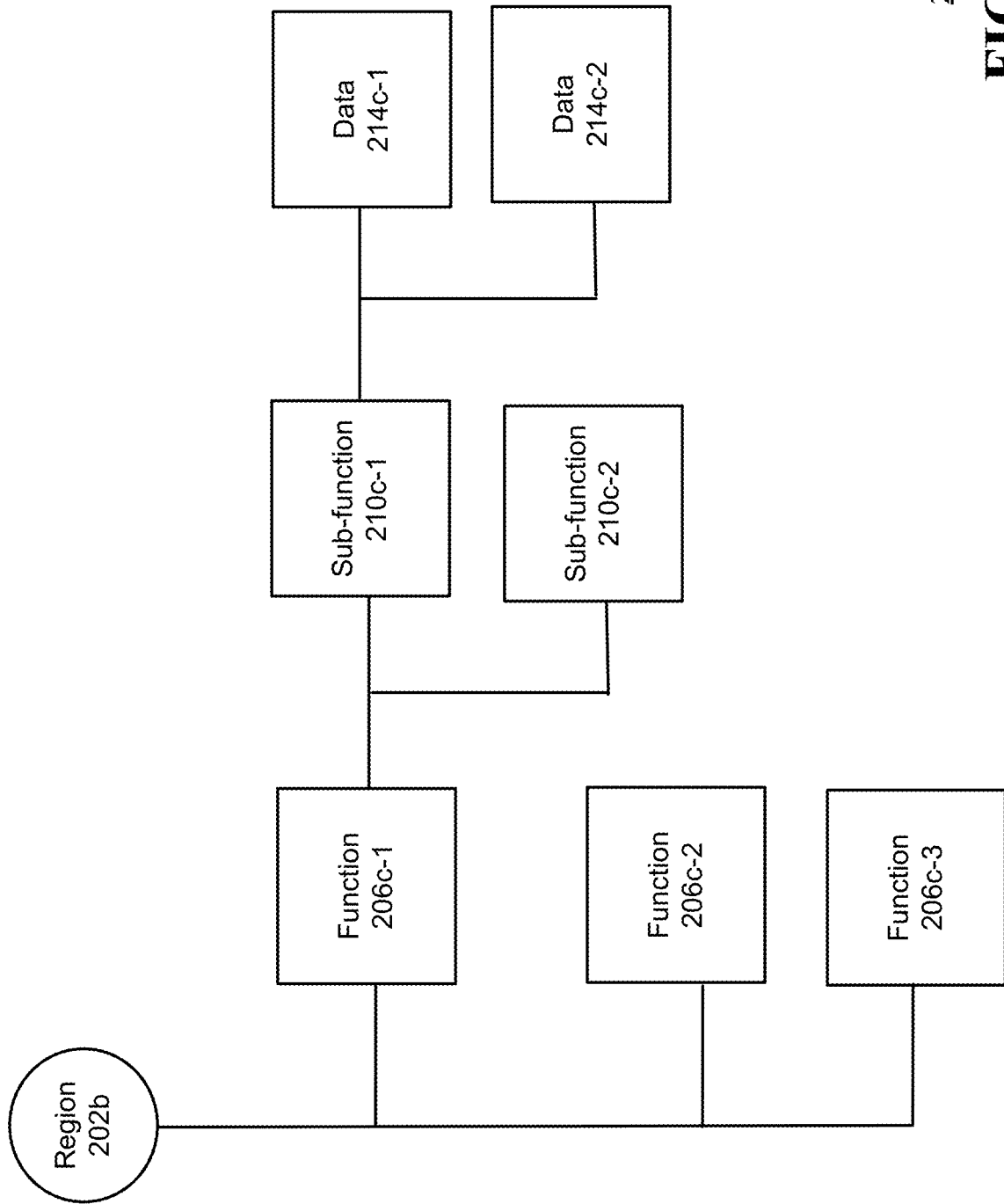

APPARATUSES AND METHODS FOR FACILITATING A GENERATION AND USE OF MODELS

FIELD OF THE DISCLOSURE

The subject disclosure relates to apparatuses and methods for facilitating a generation and use of models.

BACKGROUND

An ability to provide interfaces for operational and analytical purposes is a key factor to the success of many domain-driven applications. Some domain-driven applications have a need to structure their data for scalability, reusability, performance, and ease of client/user understanding. Because of this, many domains opt for a generic data model. Allowing for model scalability and reusability, a master/generic model can serve as a master/generic template that may be used in different ways for various use-case instance data. Sub-models that are built from, or based on, the generic template can facilitate various customizations.

Various techniques have been used to identify how the sub-models fit into, or otherwise relate to, the master model. For example, flow diagrams, an analysis of the instance data or model at the time of interest/use/adoption, and/or a reliance on a user's mental recollections have all been used. However, such techniques: are prone to error (e.g., human error) or misunderstanding on the part of users, are time-consuming, are inherently tied/tethered to the underlying architectural details (e.g., are bound to a database technology or programming constructs that is/are utilized), and don't naturally lend themselves towards reuse. As a further measure of complexity, many applications require interactions with data along multiple dimensions or paths and across multiple domains. Still further, in many instances the data, and any relationships associated with the data, is/are dynamic in nature, such that a perception or understanding of the data may need to change/adapt over time. These added complexities render the use of the aforementioned techniques impractical (e.g., economically infeasible), as it is difficult to utilize such techniques in relation to many applications, particularly those that are operative with large datasets.

BRIEF DESCRIPTION OF THE DRAWINGS

Reference will now be made to the accompanying drawings, which are not necessarily drawn to scale, and wherein:

FIGS. 2B-2C are block diagrams of models in accordance with various aspects of this disclosure.

DETAILED DESCRIPTION

The subject disclosure describes, among other things, illustrative embodiments for retrieving, loading, modifying, and/or utilizing one or more models associated with one or more applications. Other embodiments are described in the subject disclosure.

One or more aspects of the subject disclosure include, in whole or in part, obtaining a first model of first data representative of an environment, receiving an input that identifies: an object included in the environment, an attribute associated with the environment, and a filter to be applied to the first data, obtaining, based on the input, a second model representative of a portion of the environment, and generating, based on the second model, an output that identifies: a plurality of entities included in the portion of the environment, an interface between at least two entities of the plurality of entities, and an operating parameter associated with at least one entity of the plurality of entities.

One or more aspects of the subject disclosure include, in whole or in part, obtaining, from a data storage device, first data representative of a first model of a portion of a communication network responsive to a search query, subsequent to the obtaining of the first data, obtaining an input that identifies a modification to be made to a value of a parameter of a communication device of the communication network from a first value to a second value, issuing a command to the communication device to modify the value of the parameter from the first value to the second value, modifying the first data to incorporate at least the modification of the value of the parameter, resulting in second data, and saving the second data to the data storage device.

One or more aspects of the subject disclosure include, in whole or in part, presenting a first model representative of a communication system, receiving, based on the presenting of the first model, a first input that identifies a first communication device included in the communication system, responsive to the receiving of the first input, presenting values for a plurality of operating parameters associated with the first communication device, receiving a second input that includes a modification of at least one value of a parameter included in the plurality of operating parameters, identifying, based on the receiving of the second input, a second model that is dependent on the first model, and modifying the second model based on the identifying of the second model.

Figure 1:
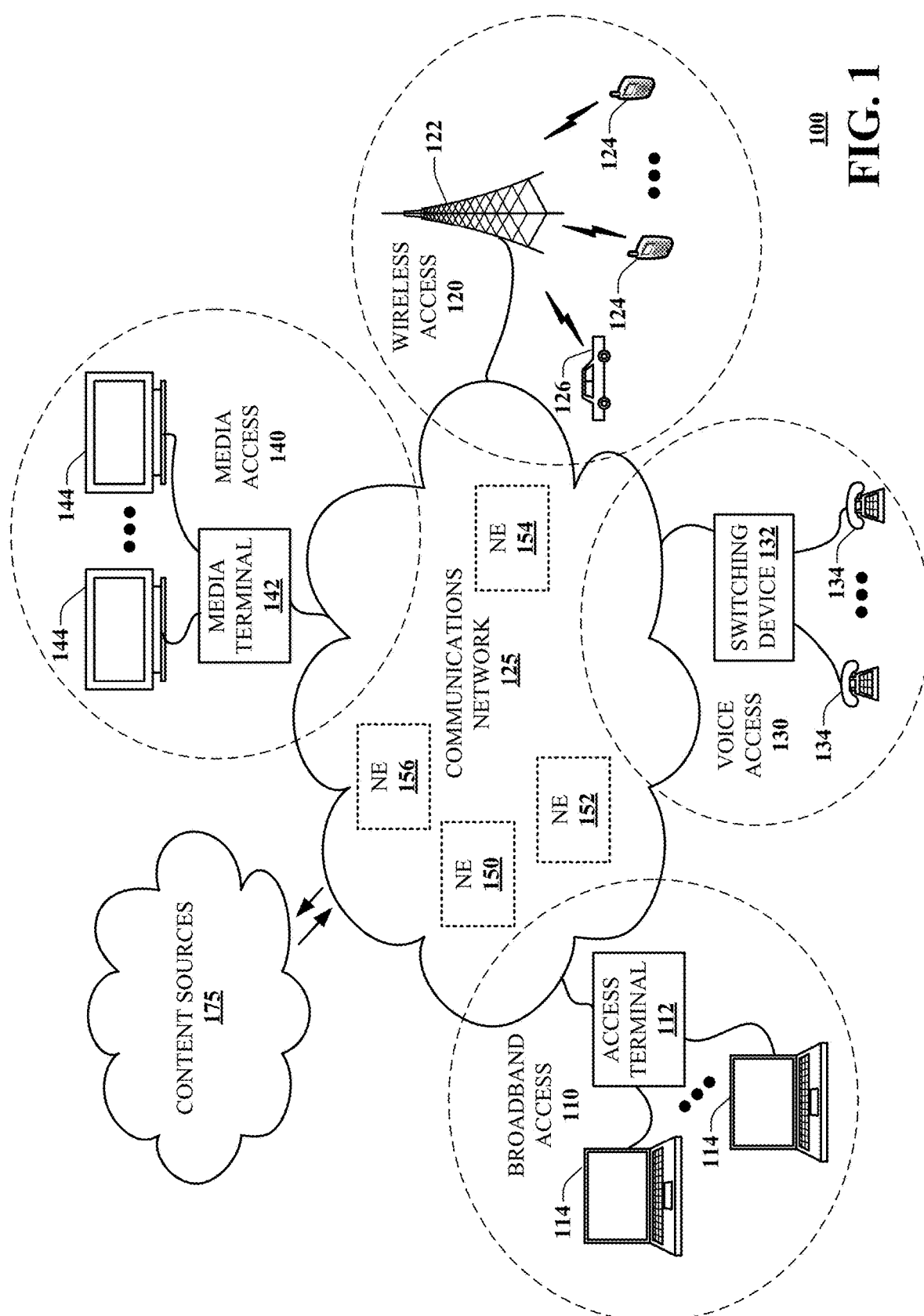
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part obtaining a first model of first data representative of an environment, receiving an input that identifies: an object included in the environment, an attribute associated with the environment, and a filter to be applied to the first data, obtaining, based on the input, a second model representative of a portion of the environment, and generating, based on the second model, an output that identifies: a plurality of entities included in the portion of the environment, an interface between at least two entities of the plurality of entities, and an operating parameter associated with at least one entity of the plurality of entities. System 100 can facilitate in whole or in part obtaining, from a data storage device, first data representative of a first model of a portion of a communication network responsive to a search query, subsequent to the obtaining of the first data, obtaining an input that identifies a modification to be made to a value of a parameter of a communication device of the communication network from a first value to a second value, issuing a command to the communication device to modify the value of the parameter from the first value to the second value, modifying the first data to incorporate at least the modification of the value of the parameter, resulting in second data, and saving the second data to the data storage device. System 100 can facilitate in whole or in part presenting a first model representative of a communication system, receiving, based on the presenting of the first model, a first input that identifies a first communication device included in the communication system, responsive to the receiving of the first input, presenting values for a plurality of operating parameters associated with the first communication device, receiving a second input that includes a modification of at least one value of a parameter included in the plurality of operating parameters, identifying, based on the receiving of the second input, a second model that is dependent on the first model, and modifying the second model based on the identifying of the second model.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
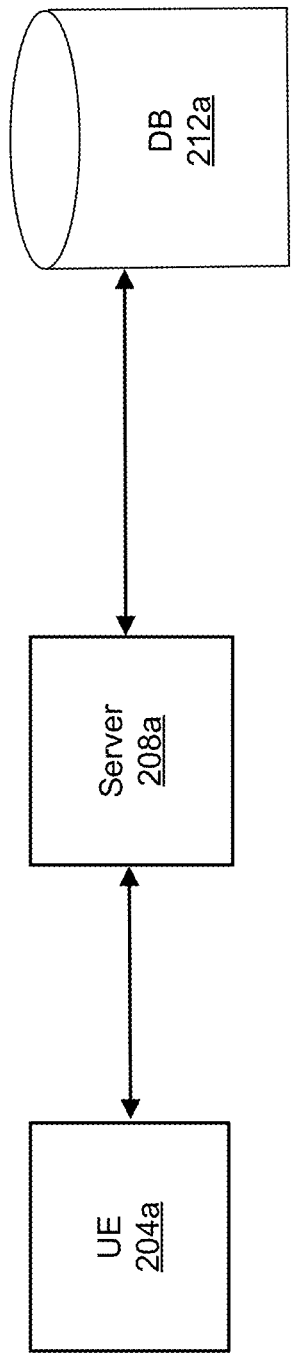
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a functioning within the communication network 100 of FIG. 1 in accordance with various aspects described herein. The system 200a may adhere to principles of a client-server architecture, whereby data or information may be obtained by a client device/user equipment (UE) 204a from a server 208a. As shown in FIG. 2A, the server 208a may, in turn, be communicatively coupled to one or more data storage devices, illustratively represented as a database (DB) 212a. The DB 212a may store the data and may provide the same to, e.g., the server 208a for use, retrieval, etc. Embodiments of this disclosure include architectures whereby data may be allocated in a distributed manner, such as for example in relation to peer-to-peer networks.

In some embodiments, at least a portion of the data of the DB 212a may be directed toward/representative of one or more models. The models may facilitate any number of applications or uses, such as for example communication services in respect of one or more users or subscribers of a communication network or system. To ensure that such communication services are available, a user (e.g., an operator or manager of the communication network, an engineer, etc.) may want to obtain an understanding of how the communication network/system is arranged at one or more layers or levels of organization. In this respect, and referring to FIG. 2B, a block diagram of a model 200b of a communication system is shown (where, for example, the communication system 200b may be represented by data of the DB 212a of FIG. 2A).

The model 200b may correspond to a selectable/identifiable region 202b, such as for example a given geographical region (e.g., a country, a state, a county, a town/city, a street, a particular residence or building, etc.). The region 202b may be associated with one or more physical network functions (PNFs), such as for example a first PNF 206b-1 and a second PNF 206b-2. A PNF may refer to a physical entity (e.g., an identifiable piece/item of hardware) that provides a specific networking function. For example, and without limitation, a PNF may include one or more routers, switches, gateways, modems, firewalls, load balancers, controllers (e.g., communication session controllers), and the like. In the context of the system 200b, the first PNF 206b-1 may correspond to a first set of PNFs and the second PNF 206b-2 may correspond to a second set of PNFs.

The first PNF 206b-1 and the second PNF 206b-2 may include, or be associated with, one or more physical interfaces (P-Interfaces). For example, and as shown in FIG. 2B, the first PNF 206b-1 may include, or be associated with, a first P-Interface 210b-1 and the second PNF 206b-2 may include, or be associated with, a second P-Interface 210b-2. A given P-Interface may include an interface that has a physical element associated with it. To demonstrate by way of example, physical elements of a P-Interface may include one or more drivers (e.g., hardware, firmware, and/or software drivers), connectors, network cards or circuits, etc.

The first P-Interface 210b-1 may include, or be associated with, a first physical link 214b-1 and the second P-Interface 210b-2 may include, or be associated with, a second physical link 214b-2. A given physical link may define a physical (e.g., an electronic) connection between two or more devices and/or may include/define a pointer in an index or record that refers to the physical location of data in one or more files.

The model 200b is representative of one example of a physical/tangible model of a communication network or system. The model 200b may be of interest to, e.g., a network/hardware resource engineer that may be tasked with ensuring that physical resources within the region 202b are operating within a set of requirements or in accordance with one or more specifications. Alternatively, or additionally, the network resource engineer may be tasked with rolling-out or deploying network resources in a different region outside of the region 202b, and thus may consult the model 200b as a starting-point or baseline for implementing best practices or proven solutions (as identified by the model 200b for the region 202b) in the different region. In this manner, the network resource engineer may realize enhanced efficiencies in terms of the roll-out in the different region by leveraging common techniques across multiple regions. Of course, to the extent that the different region presents its own unique circumstances or conditions, an instance of the model 200b may be adapted (e.g., may be modified or updated) for the different region to address those circumstances/conditions that are particular to the different region.

The model 200b was described above in terms of a physical model that may be pertinent to a network resource engineer overseeing the communication network or system in question. FIG. 2C illustrates an exemplary model 200c that may be applicable to that same communication network or system, but from the perspective of computing functions. For example, an applications engineer might not be as concerned with the details of the physical aspects of the communication network or system (as fairly represented by the model 200b of FIG. 2B) as the network resource engineer, but instead, may be more focused on the interplay or logic that may extend between instances of one or more functions (potentially irrespective of where in the underlying hardware or firmware such functions end up being executed or implemented; in this regard, aspects of the model 200c may facilitate virtual computing functionality and modeling).

The model 200c may include/incorporate a first function 206c-1, a second function 206c-2, and a third function 206c-3. In some embodiments, two or more (e.g., each) of the functions 206c-1, 206c-2, and 206c-3 may be associated with a different application and/or may represent difference instances of a common application.

Each of the functions 206c-1 through 206c-3 may oversee or control one or more sub-functions. To demonstrate, the first function 206c-1 may oversee/control a first sub-function 210c-1 and a second sub-function 210c-2. In some instances, such as for example in relation to communication sessions that may be facilitated via multiple radio access technologies (RATs), the first sub-function 210c-1 may oversee aspects of a first RAT and the second sub-function 210c-2 may oversee aspects of a second RAT.

Each of the sub-functions may be dependent on data that may be obtained from one or more sources. To demonstrate, the first sub-function 210c-1 may be dependent on first data 214c-1 and second data 214c-2. In an illustrative embodiment, the first data 214c-1 may pertain to computations or determinations of interference in the communication network or system, and the second data 214c-2 may include information pertaining to a schedule of network maintenance activities. In this regard, and continuing the above example, the sub-function 210c-1 may be responsible for predicting interference in association with the first RAT based on the scheduled maintenance activities.

While the models 200b and 200c were described separately, in some embodiments one or more aspects of a first of the models (e.g., the model 200b) may be combined with one or more aspects of the other of the models (e.g., the model 200c). For example, a network manager may be presented with a hybrid or blend of the models 200b and 200c as part of carrying out responsibilities associated with project management/oversight.

The models 200b and 200c are representative of the types of models that may be encountered as part of provisioning and managing a communication network or system. Of course, different forms of the models may be utilized in any given embodiment based on any number of factors or considerations, such as for example business-use cases, technological requirements/specifications, availabilities of resources, device capabilities, user preferences, etc.

The amount of information that is presented in conjunction with a model may be based on one or more user preferences, a role of a user within the model framework, security considerations, etc. Aspects of this disclosure may incorporate/include selective information-hiding (or, analogously, selective information-sharing), whereby details associated with a given element or item may be selectively hidden or revealed. For example, in relation to a physical communication device, an identification of operating parameters (e.g., real-time operating parameters) associated with the communication device (such as, for example, an identification of one or more RATs that are being used by the communication device, an identification of an encryption/decryption scheme that is being used by the communication device, an identification of a modulation/demodulation scheme that is being used by the communication device, an identification of a transmission power level and/or range of frequencies/frequency bands that is/are being used by the communication device, a sensitivity of a receiver of the communication device, etc.) may be identified based on placing a cursor (e.g., a mouse cursor) over a representation of the communication device in a model (or otherwise selecting the communication device within the model).

In some embodiments, one or more models may be retrieved and loaded as part of one or more user interfaces (UIs). As described above, a first/original instance of a first/original model may be modified/updated to generate a new or derivative instance of the first model. The new/derivative instance may be saved/stored to, e.g., a database to facilitate future use and/or further updates. Still further, the new/derivative instance of a model may be compared with the first/original instance of the model to determine/identify how the model has evolved over time. In this respect, each instance/version of the model may be associated with a date and timestamp in order to track such an evolution.

In some embodiments, models may be categorized or classified in accordance with metadata. The metadata may be searchable via one or more search parameters, search strings, or the like, such that models of interest may be obtained/retrieved in accordance with input search criteria. Still further, the metadata may be used as part of a search algorithm to filter-out/exclude unwanted/undesired models that bear little, if any, relationship to the input search criteria. Nested searches may be facilitated, which is to say that first search results emanating from a first search may, in turn, be searched to generate second search results that are subsumed within the first search results. Search results, inclusive of a representation of one or more models, may be presented in one or more forms or formats, such as for example a card-based view (with any accompanying statistics, much like the back of a baseball card), a tabular view, a connected graph, etc.

In some embodiments, and based on identifying dependencies between two or more models, an update to a first of the models may cause an update to one or more of the other models. In this respect, a user might not be required to understand/comprehend, or even appreciate, the existence or nature of such dependencies as between the models, while at the same time avoiding potential inconsistencies/incongruities between the models. Stated slightly differently, aspects of the disclosure may maintain consistency between related/linked models by automatically invoking any needed/necessary updates across the models. To the extent that a model-based technology of this disclosure detects a potential inconsistency that cannot automatically be resolved (such as in accordance with one or more rules), one or more warnings may be generated that may advise of the potential inconsistency. In this manner, an administrator (or other user) associated with a communication network or system may be alerted to the potential for an inconsistency in the modeling before such inconsistency manifests itself in a negative way (e.g., as a negative impact on user quality of service).

In some embodiments, attributes associated a model may be updated in bulk, potentially as part of one or more batch algorithms. For example, after loading a template of a model, the template could be modified to specify, on retrieved objects of the model, which attributes to subject to bulk update. A user (e.g., an administrator) may specify/identify which attributes, selected from a universe of attributes, to update across-the-board with various input values. Once everything is configured in respect of the modified attribute values, the bulk update may be executed relative to a backend system, thereby streamlining mass updates for, e.g., complex sub-models. If a given update does not need to be applied across-the-board, a user could opt to invoke/initiate an execution of a data extraction query and modify the resulting elements/attributes one at a time in the result set.

Figure 2D:
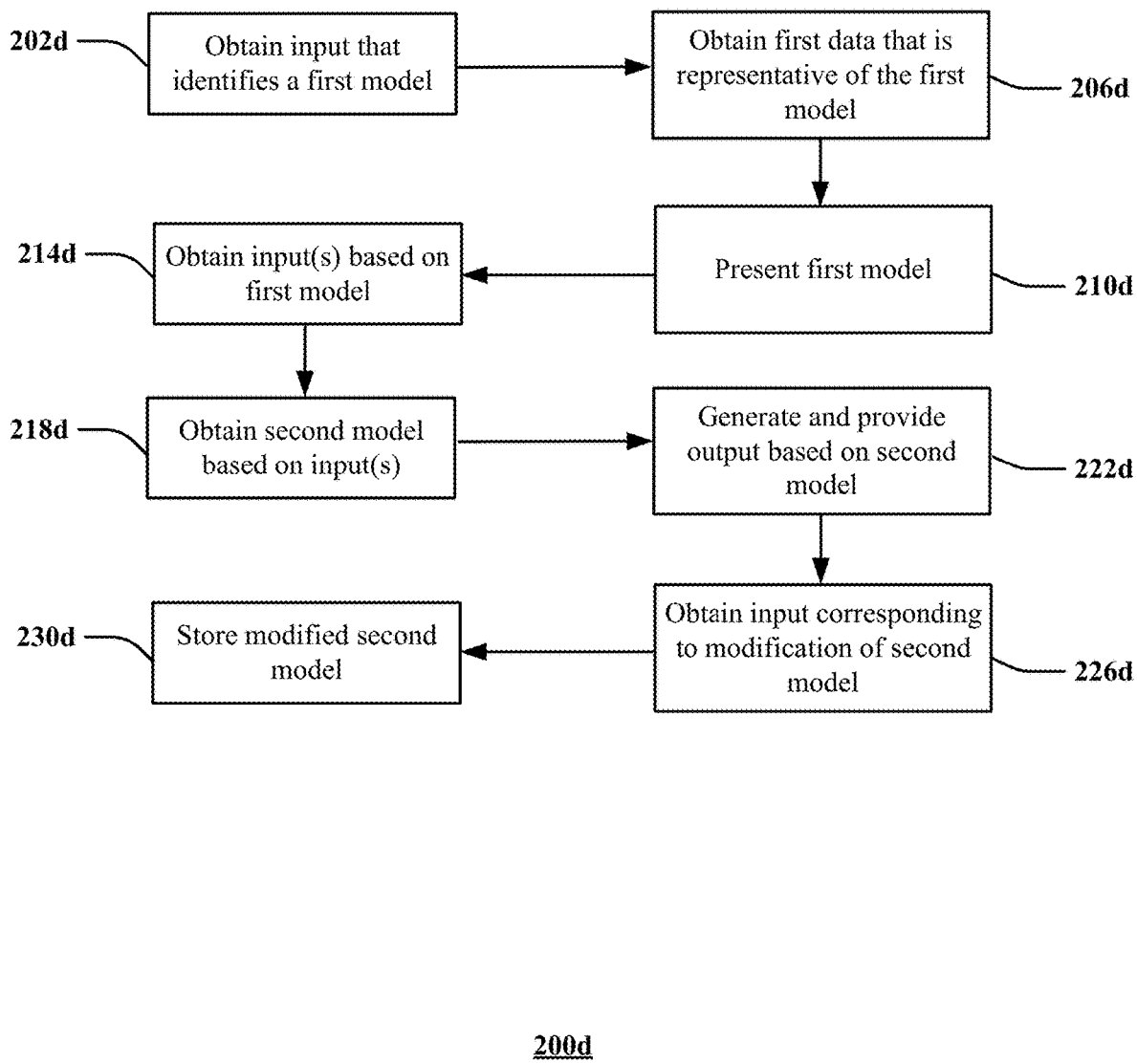
FIG. 2D depicts an illustrative embodiment of a method in accordance with various aspects described herein.

Referring now to FIG. 2D, an illustrative embodiment of a method 200d in accordance with various aspects described herein is shown. The method 200d may be facilitated (e.g., may be executed), in whole or in part, by one or more systems, devices, and/or components, such as for example the systems, devices, and components set forth herein. The method 200d may be executed to identify, utilize, update, and manage one or more models, such as for example one or more models associated with an environment (e.g., a communication system, network, or service).

In block 202d, an input may be obtained that may identify a first model. For example, the input of block 202d may pertain to a creation or generation of the first model in the first instance, such that the input may include a name (or other identifier) for the first model. Alternatively, or additionally, the input of block 202d may include a search query that is based on one or more search terms, strings, parameters, or the like.

In block 206d, first data that is representative of the first model identified by the input of block 202d may be obtained. For example, block 206d may entail/include retrieving the first data from one or more storage devices, such as a database for example.

In block 210d, the first model associated with the first data obtained as part of block 206d may be presented. The presentation of the first model may include or incorporate one or more formats, such as a visual presentation, an audio presentation, messaging, reports, etc. In some embodiments, the first model may be included as part of a list of search results based on, e.g., the search query of block 202d. The search results may be presented in order in terms of: what is the most likely/probable model that is of interest to a user, recency, frequency of use, etc.

In block 214d, one or more inputs may be obtained based on the presentation of the first model in block 210d. For example, the input(s) of block 214d may include an identification of: an object (e.g., a type of a communication device) included in the environment, an attribute (e.g., a power level range) associated with the environment, and a filter to be applied to the first data (e.g., a geographical filter, a time-based filter, etc.).

In block 218d, a second model may be obtained based on the input(s) of block 214d. The second model may be representative of a portion of the environment, where the portion may be less than a whole of the environment.

In block 222d, an output may be generated based on the second model of block 218d. For example, the output of block 222d may identify: a plurality of entities (e.g., a plurality of specific/identifiable communication devices) included in the portion of the environment, an interface (e.g., a physical communication interface/communication link) between at least two entities of the plurality of entities, and at least one operating parameter (e.g., a transmission power level, a receiver sensitivity, a modulation scheme, an encryption scheme, a communication frequency band, etc.) associated with at least one entity of the plurality of entities.

In block 226d, and based on the output of block 222d, an input may be obtained. The input of block 226d may correspond to a receipt of a modification to the second model, resulting in a modified second model.

In block 230d, the modified second model (of block 226d) may be stored to, e.g., a data storage device (such as a database). The modified second model may be accompanied by metadata that may distinguish the modified second model from other models, such as the first model (of block 202*d*) and the second model (of block 218*d*).

Subsequent to the storage of the modified second model as part of block 230*d*, the modified second model may be accessed as part of future iterations of the method 200*d*. Stated slightly differently, as part of future iterations or executions of the method 200*d*, the first model referred to in block 202*d* may correspond to the modified second model of block 230*d*. In this regard, as updates or modifications to existing models are made, those updates/modifications may be included as part of a library of models for future use.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Aspects of this disclosure enable may enable a user to create/generate custom sub-models. In some embodiments, the creation/generation of a sub-model may be based on the use of a user interface (UI). The sub-models can be used for many different purposes, such as for example in relation to: learning (e.g., machine learning), analytics, and/or dynamic data extraction.

In some embodiments, a user may be conditionally granted access to models or data via one or more authorization-based or permission-based schemes. Such schemes may, in turn, be based on obtaining and validating one or more credentials associated with the user.

In some embodiments, an intuitive interface enables self-service for one or more users interested in extracting data quickly and with ease. After a creation of one or more sub-models, the sub-models may be saved with varying degrees of metadata. Aspects of this disclosure facilitate ease of use in connection with sub-model authoring, in conjunction with highly configurable input templates, auto-generation capabilities of one or more templates, and value-added operations to users performing macro-level operations for data retrieval or writes.

Various embodiments facilitate an ability/capability to quickly and efficiently pull/identify network topologies or inventory given a pre-defined sub-model with varying inputs. Aspects of this disclosure include embodiments where data can be modeled in/as a part of a generic model with defined relationship constraints. In addition to the benefits of being able to quickly retrieve a topology from predefined sub-models, the same could be done with mass-updates or insertions to a storage of data (e.g., a database).

Embodiments of this disclosure are directed to sub-model queries that may be developed for documentation and data extraction in conjunction with an easy-to-use, intuitive interface. Aspects of this disclosure may reduce the time it takes to develop queries and generate results relative to conventional tools and technologies. Still further, the results, inclusive of one or more models or sub-models, may be presented as part of an audio presentation, a visual presentation, a report, etc.). The results may be saved/stored, loaded (e.g., read), modified/updated, and/or configured. In some embodiments, a sub-model may be executed as a query to gather instance data in a given format (e.g., a visual topological format) or used to see how a network topology has changed or evolved over time.

Aspects of this disclosure may build off-of/leverage the use of one or more database languages. However, from the perspective of a user of the technologies of this disclosure, the user might not need to understand or even know about the existence of the underlying database architecture. Instead, functionality associated with various constructs of the database language may be presented to users in audio or graphical terms/formats, thereby alleviating the user of the need to become intimately familiar with the details of the constructs. In this manner, users may be provided with an ability to serve themselves (in areas of data extraction, update, and creation, for example) to the extent possible, without requiring expertise in database management and operations.

Aspects of this disclosure enable users to extract, create, and update data for models and sub-models in a pre-structured/predetermined way and with ease.

Saved/Stored templates of models may be configured to be loaded, reconfigured, and used for one or more purposes.

In some embodiments, one or more models may be executed in a synchronous or asynchronous manner. During a synchronous execution, the intended/requested action may execute and results may be generated while a user waits. During an asynchronous execution, a backend system or platform may acknowledge a submission, may start the execution, and may advise a user when finished.

Relative to conventional technologies, aspects of this disclosure facilitate less operational overhead, more intuitive interfaces, a quicker time-to-market, automated support and documentation, and self-service enablement. Since search terms or queries can be developed on-the-fly with intuitive, easy-to-use interfaces, users are able to access and easily understand data associated with one or more models. Users might not need to engage a development team or incur development costs to obtain advanced reports or statuses. Access may be granted to visual topological data, ad-hoc custom reports, and historical topologies, potentially in conjunction with one or more presentations or renderings. Users of the technologies of this disclosure may include, without limitation: architects, system engineers, developers, and operations users. Each role/type of user may have his/her own needs in respect of access to data or models. Accordingly, aspects of this disclosure meld/combine principles of sub-modelling, documentation, and data extraction all into a single, easy-to-use platform/package. Having an ability to dynamically define sub-models and use them for querying, mass updates, and pre-structured use-cases/creates streamlines the time it takes for operations to be completed. This leads to significant benefits in terms of time and cost savings.

As described herein, aspects of this disclosure, inclusive of one or more models, may be utilized to facilitate one or more applications. Such applications may be directed to or include: a presentation of media (inclusive of a selection of advertisements), communication sessions (e.g., voice, data, video, audio, etc.), gaming (e.g., online video gaming), etc. More generally, one or more models of this disclosure may be utilized (e.g., may be presented/rendered) to facilitate any type of application. In this regard, aspects of this disclosure may facilitate operations, administration, and management (OA&M) in respect of such applications.

In some embodiments, one or more models may provide insight into how one or more systems, devices, and/or components are configured to operate. The models of this disclosure may pertain to one or more applications, inclusive of applications directed to an arrangement or organization of data within one or more storage devices (e.g., a database). In this respect, first data stored within a storage device may be descriptive of other data stored in the storage device (or another device).

In some embodiments, one or more commands or directives may be generated and provided/issued to one or more communication devices. The commands/directives may include instructions that cause the communication devices to take one or more actions. For example, the commands/directives may cause communication devices that receive the commands to modify one or more operating parameters from a first value to a second value. The commands/directives may be based on changes or modifications made to one or more models (or any data associated therewith). Thus, in relation to a communication network or system, parameters, data, and/or models may be modified based on changes made to the network or system. Such changes may include, without limitation, an addition of a communication device to the network or system, a removal of a communication device from the network or system, or a combination thereof.

As described above, various embodiments of this disclosure are directed to a detection/determination of interference in relation to one or more systems, devices, and/or components. In some embodiments, one or more models may be used to identify parameters associated with noise, interference, and received signal strength. In this regard, aspects of the disclosure may be directed to identifying a signal to interference plus noise ratio (SINR) for one or more communication devices, and taking actions to enhance the SINR for one or more communication devices. Other forms of quality metrics associated with a network, system, or device may be accommodated by aspects of this disclosure.

Figure 3:
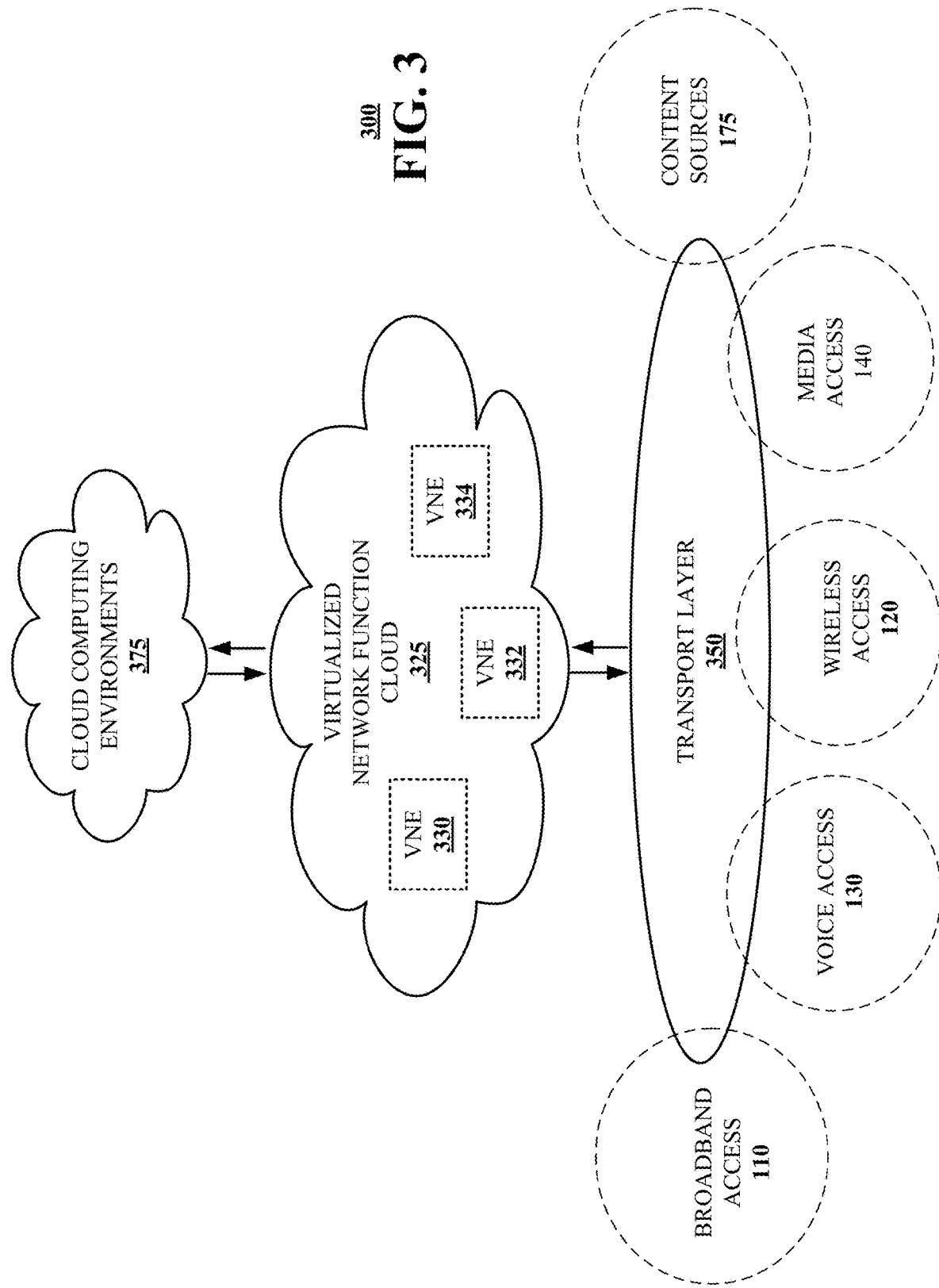
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200a, aspects of the models 200b-200c, and/or aspects of the method 200d presented in FIGS. 1 and 2A-2D. For example, virtualized communication network 300 can facilitate in whole or in part obtaining a first model of first data representative of an environment, receiving an input that identifies: an object included in the environment, an attribute associated with the environment, and a filter to be applied to the first data, obtaining, based on the input, a second model representative of a portion of the environment, and generating, based on the second model, an output that identifies: a plurality of entities included in the portion of the environment, an interface between at least two entities of the plurality of entities, and an operating parameter associated with at least one entity of the plurality of entities. Virtualized communication network 300 can facilitate in whole or in part obtaining, from a data storage device, first data representative of a first model of a portion of a communication network responsive to a search query, subsequent to the obtaining of the first data, obtaining an input that identifies a modification to be made to a value of a parameter of a communication device of the communication network from a first value to a second value, issuing a command to the communication device to modify the value of the parameter from the first value to the second value, modifying the first data to incorporate at least the modification of the value of the parameter, resulting in second data, and saving the second data to the data storage device. Virtualized communication network 300 can facilitate in whole or in part presenting a first model representative of a communication system, receiving, based on the presenting of the first model, a first input that identifies a first communication device included in the communication system, responsive to the receiving of the first input, presenting values for a plurality of operating parameters associated with the first communication device, receiving a second input that includes a modification of at least one value of a parameter included in the plurality of operating parameters, identifying, based on the receiving of the second input, a second model that is dependent on the first model, and modifying the second model based on the identifying of the second model.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
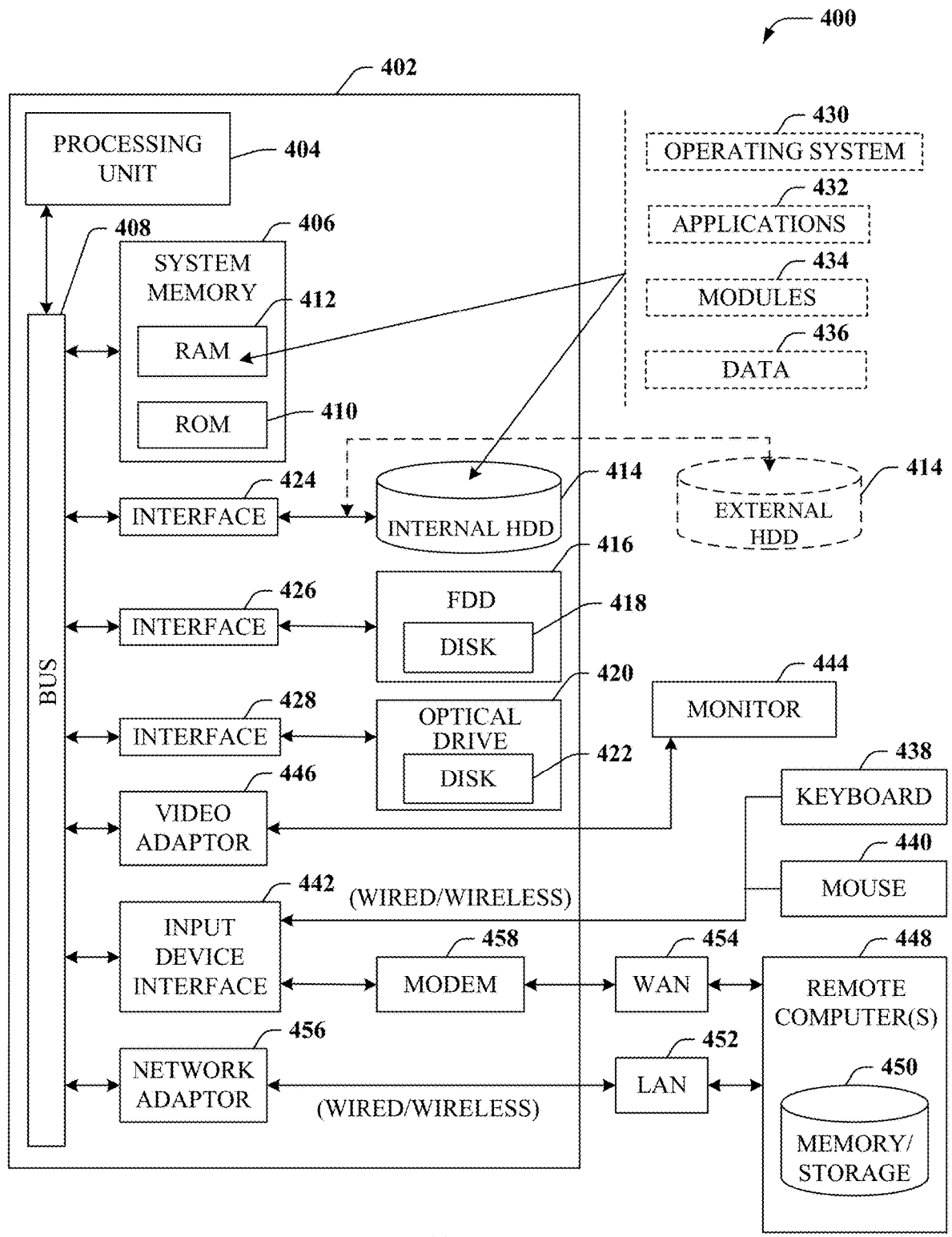
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining a first model of first data representative of an environment, receiving an input that identifies: an object included in the environment, an attribute associated with the environment, and a filter to be applied to the first data, obtaining, based on the input, a second model representative of a portion of the environment, and generating, based on the second model, an output that identifies: a plurality of entities included in the portion of the environment, an interface between at least two entities of the plurality of entities, and an operating parameter associated with at least one entity of the plurality of entities. Computing environment 400 can facilitate in whole or in part obtaining, from a data storage device, first data representative of a first model of a portion of a communication network responsive to a search query, subsequent to the obtaining of the first data, obtaining an input that identifies a modification to be made to a value of a parameter of a communication device of the communication network from a first value to a second value, issuing a command to the communication device to modify the value of the parameter from the first value to the second value, modifying the first data to incorporate at least the modification of the value of the parameter, resulting in second data, and saving the second data to the data storage device. Computing environment 400 can facilitate in whole or in part presenting a first model representative of a communication system, receiving, based on the presenting of the first model, a first input that identifies a first communication device included in the communication system, responsive to the receiving of the first input, presenting values for a plurality of operating parameters associated with the first communication device, receiving a second input that includes a modification of at least one value of a parameter included in the plurality of operating parameters, identifying, based on the receiving of the second input, a second model that is dependent on the first model, and modifying the second model based on the identifying of the second model.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
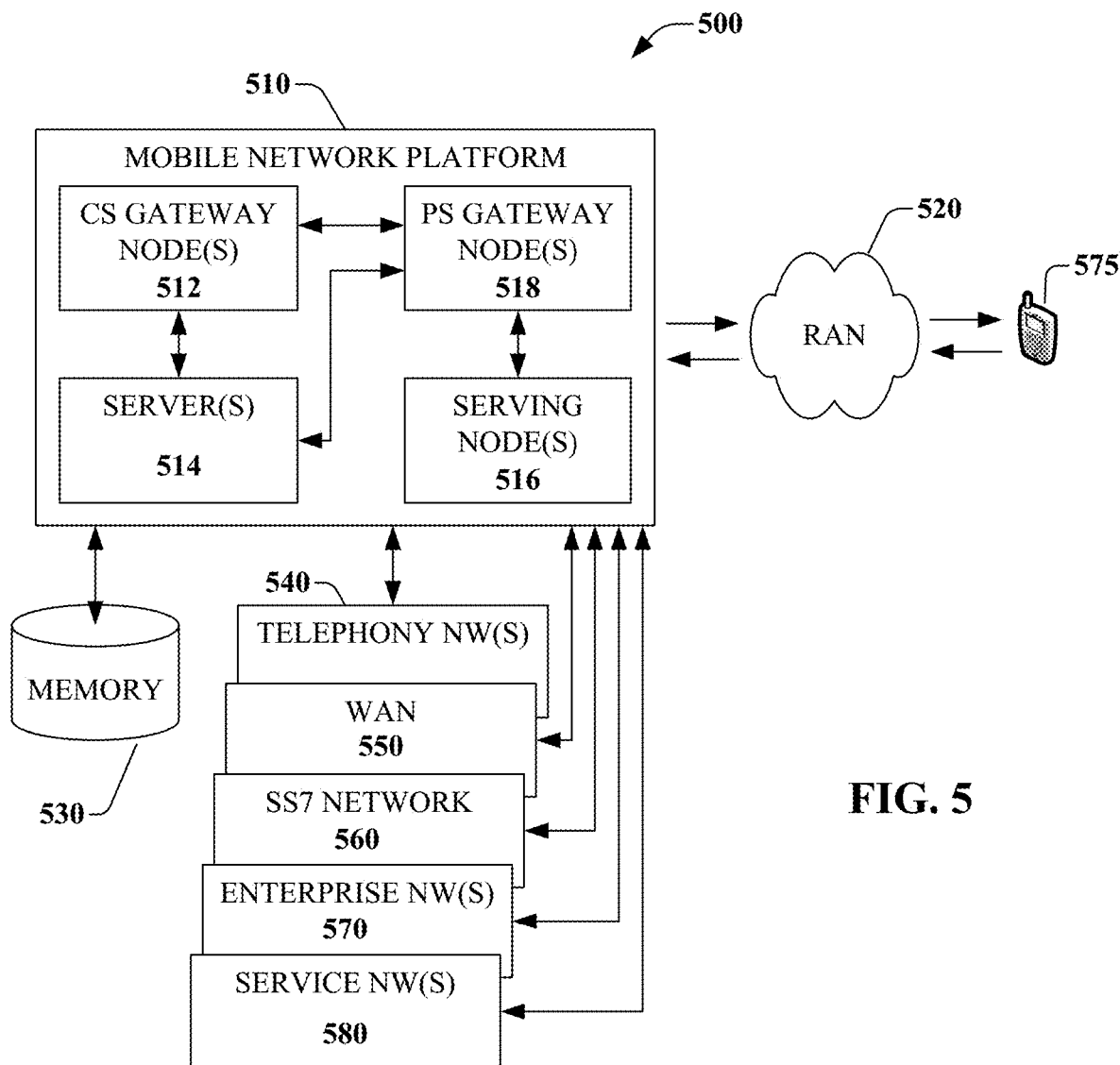
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining a first model of first data representative of an environment, receiving an input that identifies: an object included in the environment, an attribute associated with the environment, and a filter to be applied to the first data, obtaining, based on the input, a second model representative of a portion of the environment, and generating, based on the second model, an output that identifies: a plurality of entities included in the portion of the environment, an interface between at least two entities of the plurality of entities, and an operating parameter associated with at least one entity of the plurality of entities. Platform 510 can facilitate in whole or in part obtaining, from a data storage device, first data representative of a first model of a portion of a communication network responsive to a search query, subsequent to the obtaining of the first data, obtaining an input that identifies a modification to be made to a value of a parameter of a communication device of the communication network from a first value to a second value, issuing a command to the communication device to modify the value of the parameter from the first value to the second value, modifying the first data to incorporate at least the modification of the value of the parameter, resulting in second data, and saving the second data to the data storage device. Platform 510 can facilitate in whole or in part presenting a first model representative of a communication system, receiving, based on the presenting of the first model, a first input that identifies a first communication device included in the communication system, responsive to the receiving of the first input, presenting values for a plurality of operating parameters associated with the first communication device, receiving a second input that includes a modification of at least one value of a parameter included in the plurality of operating parameters, identifying, based on the receiving of the second input, a second model that is dependent on the first model, and modifying the second model based on the identifying of the second model.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
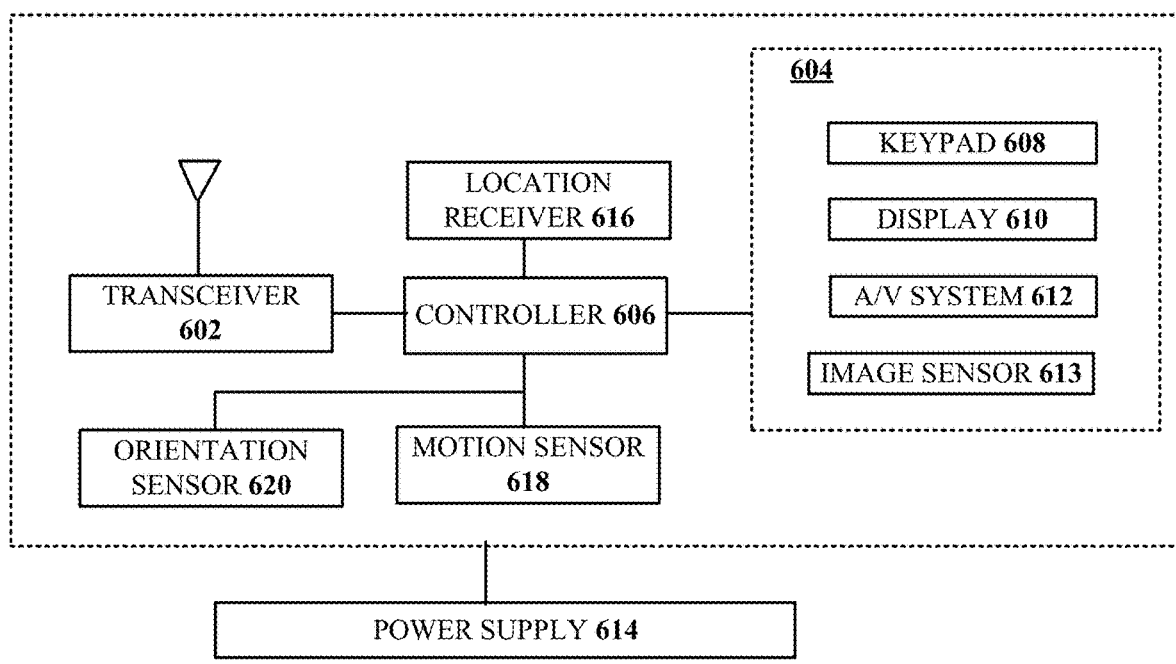
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining a first model of first data representative of an environment, receiving an input that identifies: an object included in the environment, an attribute associated with the environment, and a filter to be applied to the first data, obtaining, based on the input, a second model representative of a portion of the environment, and generating, based on the second model, an output that identifies: a plurality of entities included in the portion of the environment, an interface between at least two entities of the plurality of entities, and an operating parameter associated with at least one entity of the plurality of entities. Computing device 600 can facilitate in whole or in part obtaining, from a data storage device, first data representative of a first model of a portion of a communication network responsive to a search query, subsequent to the obtaining of the first data, obtaining an input that identifies a modification to be made to a value of a parameter of a communication device of the communication network from a first value to a second value, issuing a command to the communication device to modify the value of the parameter from the first value to the second value, modifying the first data to incorporate at least the modification of the value of the parameter, resulting in second data, and saving the second data to the data storage device. Computing device 600 can facilitate in whole or in part presenting a first model representative of a communication system, receiving, based on the presenting of the first model, a first input that identifies a first communication device included in the communication system, responsive to the receiving of the first input, presenting values for a plurality of operating parameters associated with the first communication device, receiving a second input that includes a modification of at least one value of a parameter included in the plurality of operating parameters, identifying, based on the receiving of the second input, a second model that is dependent on the first model, and modifying the second model based on the identifying of the second model.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL- DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:
obtaining, by a processing system including a processor, first data corresponding to a first model, the first model being representative of an environment, the first model forming a scalable, reusable master model of selected aspects of the environment for analysis and modification of the environment;
receiving, by the processing system, an input that identifies: an object included in the environment, an attribute associated with the environment, and a filter to be applied to the first data;
obtaining, by the processing system and based on the input, a second model representative of a portion of the environment, wherein the portion of the environment is defined based on the object, the attribute, and the filter, the second model forming a sub-model based on the master model; and
generating, by the processing system and based on the second model, an output that identifies: a plurality of entities included in the portion of the environment, an interface between at least two entities of the plurality of entities, and an operating parameter associated with at least one entity of the plurality of entities, the output enabling data gathering and analysis of selected aspects of the sub-model.

2. The method of claim 1, wherein the environment includes a communication network.

3. The method of claim 2, wherein the plurality of entities includes a server, a network switch, a network router, a gateway, and a user equipment, wherein the interface includes a physical communication interface between the at least two entities, and wherein the operating parameter includes a specification of: a frequency band.

4. The method of claim 1, further comprising:
subsequent to the generating of the output, receiving, by the processing system, a modification to the second model, resulting in a modified second model;
storing, by the processing system, the modified second model to a database;
subsequent to the storing of the modified second model to the database, obtaining, by the processing system, a search request; and
responsive to the obtaining of the search request, providing, by the processing system, the modified second model to a user equipment.

5. The method of claim 4, wherein the obtaining of the first model comprises obtaining the first model from the database.

6. The method of claim 4, wherein the obtaining of the first model comprises obtaining the first model from a second user equipment.

7. The method of claim 1, further comprising:
obtaining, by the processing system, a search request, wherein the obtaining of the first model is based on the obtaining of the search request.

8. The method of claim 1, wherein the second model identifies: a plurality of physical network functions associated with the environment, a respective plurality of physical interfaces associated with each of the physical network functions, and at least one respective physical link associated with each of the physical interfaces.

9. The method of claim 1, wherein the second model identifies a plurality of functions and a respective plurality of sub-functions associated with each of the functions.

10. The method of claim 9, wherein the second model incorporates second data, and wherein the second data is associated with a plurality of radio access technologies (RATs).

11. The method of claim 1, wherein the second model facilitates a presentation of media, and wherein the second model facilitates a selection of advertisements that are incorporated as part of the presentation of media.

12. The method of claim 1, further comprising:
obtaining, by the processing system, a security credential associated with a user; and
validating, by the processing system, the security credential,
wherein the obtaining of the first model is based on the validating of the security credential.

13. A device, comprising:
a processing system including a processor; and
a memory that stores executable instructions that, when executed by the processing system, facilitate performance of operations, the operations comprising:
receiving an input that identifies: an object included in an environment, an attribute associated with the environment, and a filter to be applied to first data representative of the environment;
obtaining, based on the input, a model representative of a portion of the environment, the model forming a master model of selected aspects of the environment, the model being representative of a portion of a communication network;
modifying the first data based on an addition of a first communication device to the communication network, a removal of a second communication device from the communication network, or a combination thereof, resulting in second data; and
saving the second data to a data storage device;
generating, based on the model, an output that identifies an operating parameter associated with at least one entity of a plurality of entities included in the portion of the environment, the output for analysis of selected aspects of the environment, the selected aspects of the environment including at least one of a network topology and a network inventory;
receiving a second input that identifies: a second object included in the environment, a second attribute associated with the environment, and a second filter to be applied to the second data of the data storage device;
obtaining, based on the second input, a second model representative of a second portion of the environment, the second model forming a sub-model based on the master model; and
generating, based on the second model, a second output that identifies: a second plurality of entities included in the second portion of the environment, an interface between at least two entities of the second plurality of entities, a second operating parameter associated with at least one entity of the second plurality of entities, or any combination thereof.

14. The device of claim 13, wherein the operations further comprise:
presenting a rendering in accordance with the first data, wherein the receiving of the input occurs subsequent to the presenting of the rendering.

15. The device of claim 13, wherein first metadata is associated with the first data in the data storage device, and wherein the operations further comprise:

saving second metadata associated with the second data to the data storage device, wherein the first metadata includes a first timestamp and the second metadata includes a second timestamp.

16. The device of claim 13, wherein the plurality of entities includes a server, a network switch, a network router, a gateway, and a user equipment, wherein the interface includes a physical communication interface between the at least two entities, and wherein the operating parameter includes a specification of: a frequency band.

17. The device of claim 13, further comprising:

obtaining a search request, wherein the obtaining of the first model is based on the obtaining of the search request.

18. A non-transitory machine-readable medium, comprising executable instructions that, when executed by a processing system including a processor, facilitate performance of operations, the operations comprising:

obtaining first data corresponding to a first model, the first model being representative of an environment including a communication system, the first model forming a master model of selected aspects of the environment;

receiving an input that identifies a filter to be applied to the first data;

obtaining, based on the input, a second model representative of a portion of the environment, wherein the portion of the environment is defined based on the filter to be applied to the data, wherein the second model forms a sub-model based on the master model; and generating, based on the second model, an output that identifies an operating parameter associated with at least one entity included in the portion of the environment, the output for data gathering and analysis of selected aspects of the sub-model.

19. The non-transitory machine-readable medium of claim 18, wherein the operating parameter comprises a modulation scheme and wherein the modulation scheme pertains to second network infrastructure included in the portion of the environment.

20. The non-transitory machine-readable medium of claim 18, wherein the second model includes a first function associated with a first instance of a first application, a second function associated with a second instance of the first application, and a third function associated with a second application that is different from the first application, wherein the third function controls a first sub-function and a second sub-function, wherein the first sub-function oversees first aspects of a first radio access technology (RAT) that facilitates a first communication session, and wherein the second sub-function oversees aspects of a second RAT that facilitates a second communication session.

* * * * *